(12) United States Patent
Zhang

(10) Patent No.: US 11,361,056 B2
(45) Date of Patent: Jun. 14, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Zhenrui Zhang, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 481 days.

(21) Appl. No.: 16/151,614

(22) Filed: Oct. 4, 2018

(65) Prior Publication Data

US 2019/0114403 A1  Apr. 18, 2019

(30) Foreign Application Priority Data

Oct. 18, 2017  (JP) .............................. JP2017-201874

(51) Int. Cl.
*G06F 21/12* (2013.01)
*G06F 21/31* (2013.01)
*G06F 21/62* (2013.01)

(52) U.S. Cl.
CPC ............ *G06F 21/31* (2013.01); *G06F 21/121* (2013.01); *G06F 21/6245* (2013.01); *G06F 21/12* (2013.01); *G06F 21/62* (2013.01)

(58) Field of Classification Search
CPC ...... G06F 21/31; G06F 21/62; G06F 21/6245; G06F 21/12; G06F 21/121
See application file for complete search history.

(56) References Cited

U.S. PATENT DOCUMENTS

| 8,656,473 | B2* | 2/2014 | Hall | ..................... H04W 12/068 |
| | | | | 726/9 |
| 9,092,637 | B2* | 7/2015 | Mathew | .................. G06F 21/62 |
| 9,871,757 | B1* | 1/2018 | Reardon | ................. H04L 51/32 |
| 10,182,059 | B2* | 1/2019 | Kishida | ................. H04L 63/104 |
| 2005/0204041 | A1* | 9/2005 | Blinn | ...................... H04L 63/08 |
| | | | | 709/225 |
| 2017/0272445 | A1* | 9/2017 | Kishida | ................... H04L 63/08 |

FOREIGN PATENT DOCUMENTS

| JP | 2013-008140 A | 1/2013 |
| WO | 2012/176506 A1 | 12/2012 |

OTHER PUBLICATIONS

Jul. 6, 2021 Office Action issued in Japanese Patent Application No. 2017-201874.

* cited by examiner

*Primary Examiner* — Jayesh M Jhaveri
(74) *Attorney, Agent, or Firm* — Oliff PLC

(57) ABSTRACT

An information processing apparatus includes: an acquisition unit that acquires first group information concerning a user from authentication result information including an authentication result transmitted from an external apparatus in a case where the user is authenticated by the external apparatus; and a permission unit that permits the user to use a service provided by the information processing apparatus within a range of authority set for second group information concerning the user in a case where the acquired first group information is associated with the second group information.

9 Claims, 12 Drawing Sheets

FIG. 7A

SERVICE-SIDE LOGIN SCREEN — 400

- ID — 401
- PW — 402
- LOGIN — 403
- PROVIDER A — 404a
- PROVIDER B — 404b
- PROVIDER C — 404c

FIG. 7B

SERVICE-SIDE MANAGEMENT SCREEN — 410

- TENANT MANAGEMENT — 411
- LINKAGE PARTNER SETTING REGION — 411a
- LINKAGE PARTNER INFORMATION SETTING REGION — 412

Enlarged view (411a):

| SELECT LINKAGE PARTNER | SELECT PROCESSING |
|---|---|
| ☑ PROVIDER A | SETUP — 411b |
| ☐ PROVIDER B | CANCEL |
| ☐ PROVIDER C | — 411c |

| LINKAGE PARTNER TYPE | LINKAGE PARTNER INFORMATION |
|---|---|
| PROVIDER A | 111-XXX-AAA |
| PROVIDER B | NOT LINKED |
| PROVIDER C | NOT LINKED |

LINKAGE PARTNER LOGIN SCREEN — 420

- ID — 421
- PW — 422
- LOGIN — 423

FIG. 7D

SCREEN FOR PERMISSION OF TRANSMISSION OF INFORMATION FOR LINKAGE — 430

PERMIT NOTIFICATION OF INFORMATION BELOW TO *** SERVICE? — 431

· DIRECTORY ID

- YES — 432
- NO — 433

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-201874 filed Oct. 18, 2017.

BACKGROUND

Technical Field

The present invention relates to an information processing apparatus, an information processing system, and a non-transitory computer readable medium.

SUMMARY

According to an aspect of the invention, there is provided an information processing apparatus including: an acquisition unit that acquires first group information concerning a user from authentication result information including an authentication result transmitted from an external apparatus in a case where the user is authenticated by the external apparatus; and a permission unit that permits the user to use a service provided by the information processing apparatus within a range of authority set for second group information concerning the user in a case where the acquired first group information is associated with the second group information.

BRIEF DESCRIPTION OF THE DRAWINGS

An exemplary embodiment of the present invention will be described in detail based on the following figures, wherein:

FIG. 5A illustrates a first linkage information table, and FIG. 5B illustrates a second linkage information table;

FIGS. 7A through 7D each illustrates an example of a screen displayed on a display of an administrator terminal apparatus;

DETAILED DESCRIPTION

Figure 1:
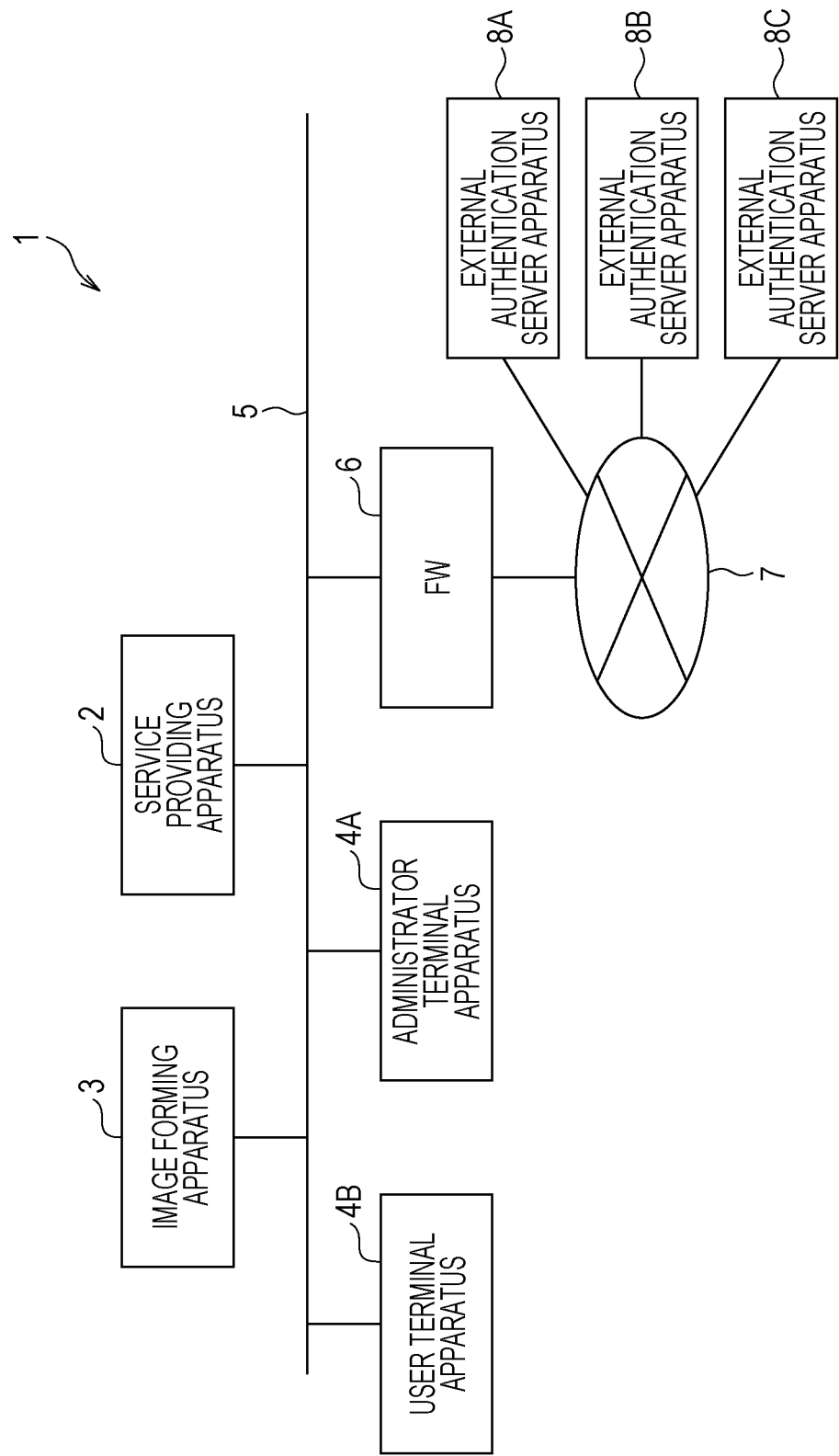
FIG. 1 illustrates an example of a configuration of a service providing system according to an exemplary embodiment of the present invention.

An exemplary embodiment of the present invention is described below with reference to the drawings. In the drawings, constituent elements that have substantially identical functions are given identical reference signs, and repeated description thereof is omitted.

Summary of Exemplary Embodiment

An information processing apparatus according to an embodiment of the present invention includes: an acquisition unit that acquires first group information concerning a user from authentication result information including an authentication result transmitted from an external apparatus in a case where the user is authenticated by the external apparatus; and a permission unit that permits the user to use a service provided by the information processing apparatus within a range of authority set for second group information concerning the user in a case where the acquired first group information is associated with the second group information.

The "external apparatus" is an apparatus having an authentication function that is connected to an external network such as the Internet. The "authentication result information" includes an authentication result (success or failure of authentication), user information for specifying a user, and first group information. The "first group information" is information indicative of an organization to which the user belongs and is, for example, a directory ID. The "second group information" is information indicative of an organization that is permitted to have authority equal to the user belonging to the organization and is, for example, a tenant ID. The organization" is a group of persons and is, for example, a company, an organization (e.g., a division, a team, or a group) belonging to a company, or an association. The "service provided by the information processing apparatus" includes a service linked with an outside. The term "authenticate" refers to recognizing a user (including an administrator) of a terminal apparatus as being a user registered in advance on the basis of authentication information. The term "permit" refers to permitting an authenticated user to use a service within a range of preset authority. Examples of the "authentication information" include a combination of a user ID for uniquely identifying a user and a password and a combination of an account ID for uniquely identifying an access right and a password. Alternatively, the authentication information may be a personal identification number (PIN) code, a one-time password, or the like.

The "internal network" is a network that is different from a network to which an external apparatus having an authentication function is connected. That is, the "internal network" is not limited to an intranet relative to the Internet and may be an independent network on the Internet.

The service provider does not always permit a service user to use all services. For example, the service provider sometimes only permits a user of a storage service to view a file or sometimes permits the user to update a file but does not permit the user to delete a file. The service provider (administrator) of the apparatus sometimes sets such authority concerning service use for each user in advance when registering the user.

Exemplary Embodiment

FIG. 1 illustrates an example of a configuration of a service providing system according to an exemplary embodiment of the present invention. The service providing system 1 includes a service providing apparatus 2, an image forming apparatus 3, an administrator terminal apparatus 4A, and a user terminal apparatus 4B.

The service providing apparatus 2, the image forming apparatus 3, the administrator terminal apparatus 4A, and the user terminal apparatus 4B are connected to one another over an internal network 5.

The internal network 5 is connected to an external network 7 such as the Internet through a firewall (FW) 6. Plural (for example, three) external authentication server apparatuses 8A, 8B, and 8C (sometimes collectively referred to as "external authentication server apparatuses 8") are provided on the external network 7.

An internal network 5 side relative to the firewall 6 is referred to as a "service side". The administrator terminal apparatus 4A is used by an administrator. The user terminal apparatus 4B is used by a user other than the administrator. The administrator is, for example, a service-side administrator and is a user who has special authority on an external authentication server apparatus 8 side.

The service providing system 1 is an example of an information processing system. The service providing apparatus 2 is an example of an information processing apparatus. The number of image forming apparatuses 3 is not limited to one and may be more than one. Although only a single user terminal apparatus 4B is illustrated in FIG. 1, plural user terminal apparatuses 4B are generally connected to the internal network 5. The administrator terminal apparatus 4A and the user terminal apparatus 4B are sometimes collectively referred to as terminal apparatuses 4. The external authentication server apparatuses 8 are an example of the external apparatus. The external apparatus is not limited to the external authentication server apparatuses 8 and may be, for example, a cloud storage device (not illustrated) connected to the external network 7.

The service providing apparatus 2 performs an authentication process for determining whether or not user's authentication information (e.g., a user ID and a password) is appropriate and a permission process for determining whether or not the user has authority to use a service after the authentication process. In a case where authentication succeeds in any of the external authentication server apparatuses 8, the service providing apparatus 2 performs the permission process while omitting the authentication process. Single sign-on is thus realized. Single sign-on allows a user to use plural services just by being authenticated once. The service providing apparatus 2 permits a user who has been authorized and permitted to use a service over the internal network 5. Examples of a service (hereinafter referred to as a "subject service") provided by the service providing apparatus 2 include a print service, a storage service linked with an external cloud storage on the external network 7, and an external print service linked with an external cloud server on the external network 7. The external print service is a service for printing out from a printer managed by the external cloud server.

The image forming apparatus 3 is, for example, a multifunction printer having plural functions such as a copy function, a scan function, a print function, and a facsimile function. The image forming apparatus 3 includes a controller that is constituted by a CPU, an interface, and the like and controls each unit of the image forming apparatus 3, a storage unit in which a program for the CPU and various kinds of data are stored, and an operation display unit that displays various screens and receives operation on a screen. The program includes a web browser for web page browsing. The operation display unit has, for example, a touch panel display configured such that a touch panel is superimposed on a display such as a liquid crystal display. The image forming apparatus 3 becomes a candidate for a destination of print output in a case where the print service provided by the service providing apparatus 2 is used.

The administrator terminal apparatus 4A includes a controller that is constituted by a CPU, an interface, and the like and controls each unit of the administrator terminal apparatus 4A, a storage unit in which a program for the CPU and various kinds of data are stored, an input unit constituted by a keyboard, a mouse, and the like, and a display constituted by a liquid crystal display or the like. The program includes a web browser for web page browsing. The administrator terminal apparatus 4A can be, for example, an information processing apparatus such as a personal computer (PC) or a multifunction mobile phone (smartphone). The user terminal apparatus 4B has a configuration similar to the administrator terminal apparatus 4A.

The internal network 5 is a computer network that connects a computer and an apparatus in an organization such as a company and is, for example, a local area network (LAN) or an intranet. The internal network 5 may be a wired network or may be a wireless network.

A purpose of the firewall 6 is to prevent illegal access or intrusion from an outside and is set so as to allow passage of a request from the terminal apparatus 4 to the external network 7 and a response to the request but not to allow passage of a request from the external network 7 side to the terminal apparatus 4.

The external authentication server apparatuses 8 are, for example, managed by ID providers (also called authentication providers) such as Microsoft, Yahoo, and Google. These ID providers provide social network services (SNS) by service names of Microsoft Azure Active Directory (AD) (Microsoft and Active Directory are registered trademarks), Yahoo! (registered trademark), and Google Accounts (Google is registered trademark). Hereinafter, ID providers that manage the external authentication server apparatuses 8A, 8B, and 8C are referred to as a "provider A", a "provider B", and a "provider C", respectively.

Figure 2:
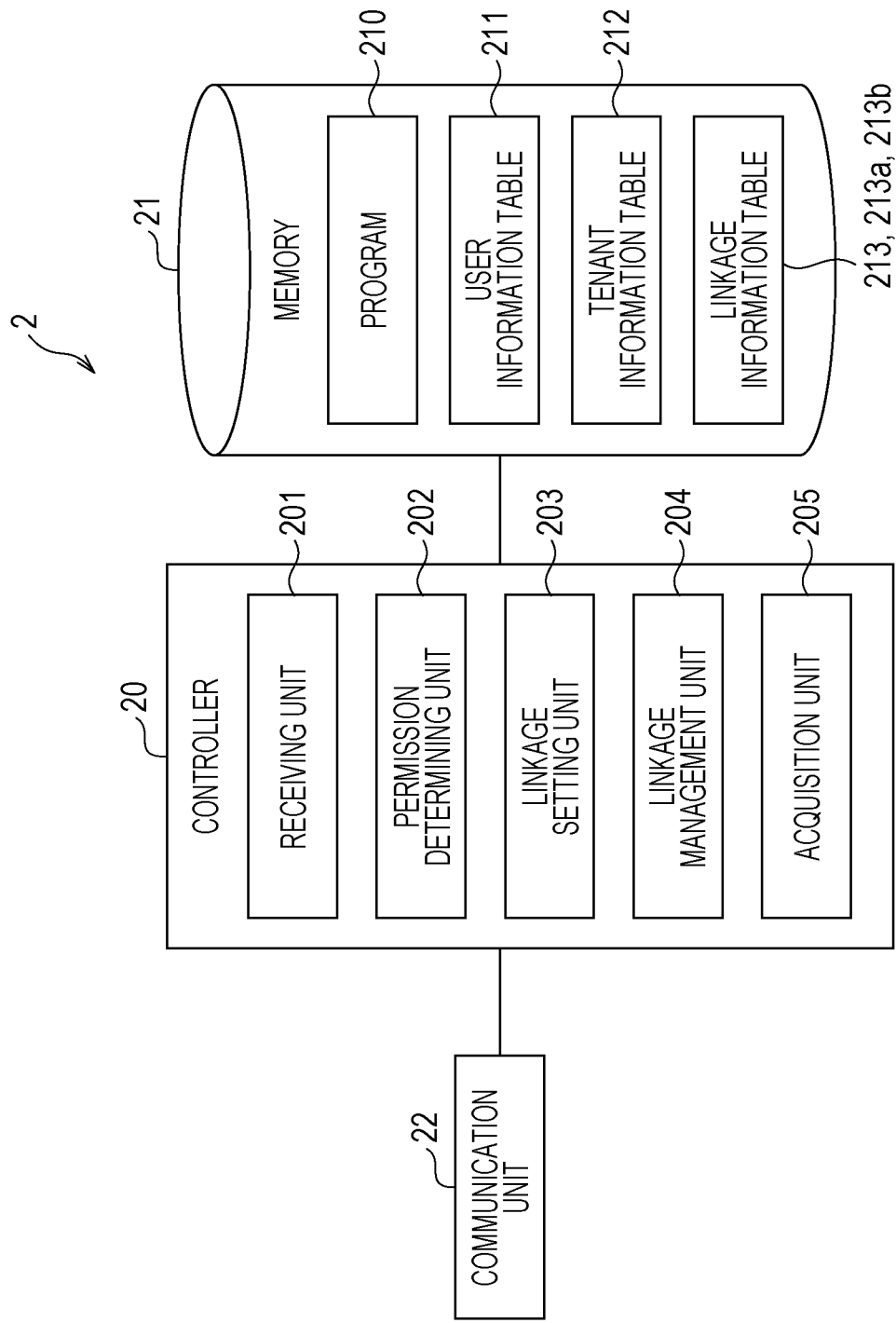
FIG. 2 illustrates an example of a control system of the service providing apparatus.

FIG. 2 illustrates an example of a control system of the service providing apparatus 2. The service providing apparatus 2 includes a controller 20 that controls each unit of the service providing apparatus 2, a memory 21 in which various kinds of information are stored, and a communication unit 22.

The controller 20 is constituted by a central processing unit (CPU), an interface, and the like. The CPU operates in accordance with a program 210 stored in the memory 21 and thus functions as a receiving unit 201, a permission determining unit 202, a linkage setting unit 203, a linkage management unit 204, an acquisition unit 205, and the like. The permission determining unit 202 is an example of a permission unit. The linkage management unit 204 is an example of a presenting unit and an updating unit. Details of the units 210 through 205 will be described later.

The memory 21 is constituted by a read only memory (ROM), a random access memory (RAM), a hard disk, and the like and stores therein the program 210, a user information table 211 (see FIG. 3), a tenant information table 212 (see FIG. 4), a linkage information table 213 (see FIG. 5), and the like. The user information table 211 and the tenant information table 212 are an example of a second memory. The linkage information table 213 is an example of a first memory. In the present specification, the term "record" or "register" is used in a case where information is written into a table, and the term "store" is used in a case where information is written into a memory.

The communication unit 22 is constituted by a network interface card (NIC) or the like and communicates with the image forming apparatus 3 and the terminal apparatus 4 over the internal network 5 and communicates with external apparatuses such as the external authentication server apparatuses 8 over the internal network 5, the FW 6, and the external network 7.

Figure 3:
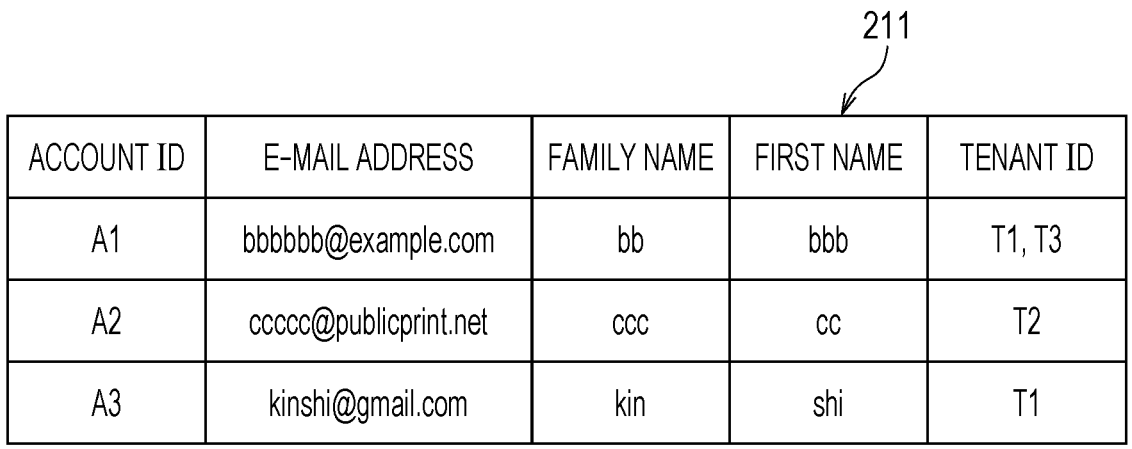
FIG. 3 illustrates an example of a user information table.

FIG. 3 illustrates an example of the user information table 211. The user information table 211 is a database in which information on an existing user is stored. The user information table 211 includes items such as an account ID, an e-mail address, a family name, a first name, and a tenant ID. A password and the like (not illustrated) corresponding to the account ID are also registered in the user information table 211. In the account ID field, an account ID for uniquely identifying an account is recorded. The account, which allows a user to use a service, is also called a user account. Accordingly, the account ID is sometimes referred to as a user ID. In the e-mail address field, an e-mail address of the user terminal apparatus 4B used by the user is recorded. The e-mail address is an example of address information. In the family name field, a family name of the user is recorded. In the first name field, a first name of the user is recorded. In the tenant ID field, a tenant ID of a tenant that can be accessed by the user is recorded. In a case where the user can access plural tenants, plural tenant IDs are recorded for a single account ID in the tenant ID field. The account ID, e-mail address, family name, first name, and tenant ID recorded in the user information table 211 are an example of second user information. The e-mail address, the family name, and the first name are an example of predetermined information.

Figure 4:
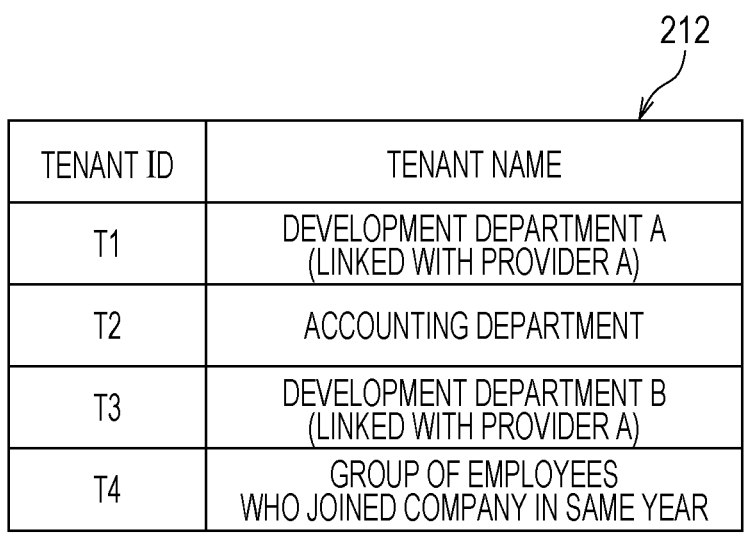
FIG. 4 illustrates an example of a tenant information table.

FIG. 4 illustrates an example of the tenant information table 212. The tenant information table 212 is a database in which service-side tenant information is stored. The tenant information table 212 includes items such as a tenant ID and a tenant name. In the tenant field, a tenant ID for uniquely identifying a tenant is recorded. In the tenant name field, a tenant name is recorded. The "tenant" refers, for example, to an organization such as a department, a group, or a team that can be accessed by a user and sometimes encompasses an organization to which the user belongs. For example, there are cases where a user can access plural tenants. Furthermore, there are cases where a user does not belong to any tenant although a user generally belongs to a single tenant. A tenant is set for each user by an administrator that manages the internal network 5 side. In the tenant name field, "linkage with provider A" means that a tenant ID is associated with a directory ID of the provider A. The tenant ID is an example of second group information.

Figure 5A:
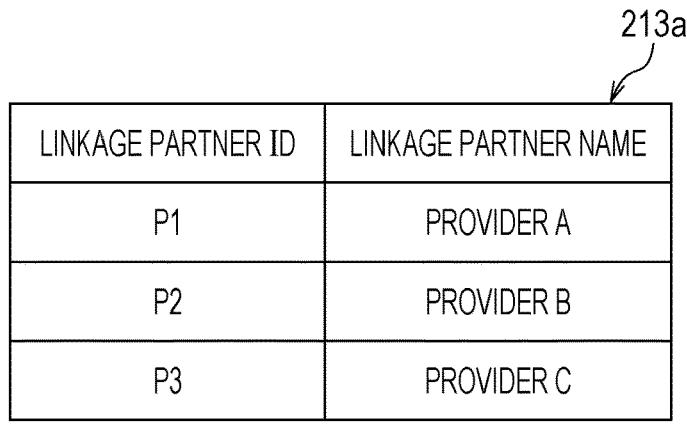
FIGS. 5A and 5B illustrate an example of a linkage information table.
Figure 5B:
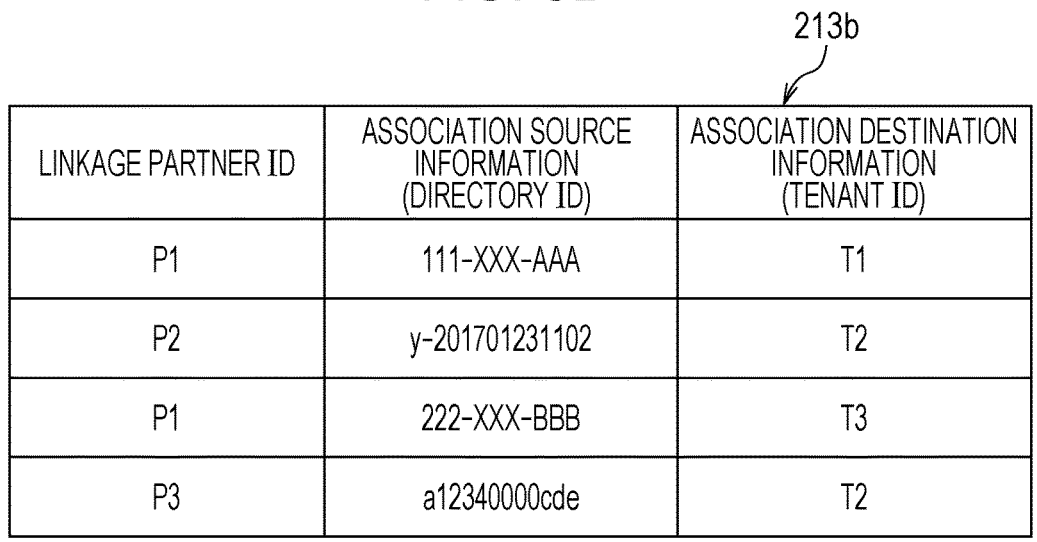

FIG. 5 illustrates an example of the linkage information table 213. The linkage information table 213 is a database in which association information for linkage including association source information and association destination information is stored. The linkage information table 213 includes a first linkage information table 213a illustrated in FIG. 5A and a second linkage information table 213b illustrated in FIG. 5B.

The first linkage information table 213a illustrated in FIG. 5A includes items such as a linkage partner ID and a linkage partner name. In the linkage partner ID field, a linkage partner ID for uniquely identifying a linkage partner is recorded. In the linkage partner name field, a name (e.g., a provider name) of the linkage partner is recorded.

The second linkage information table 213b illustrated in FIG. 5B includes items such as a linkage partner ID, association source information (e.g., a directory ID), and association destination information (e.g., a tenant ID). In the linkage partner ID field, a linkage partner ID is recorded as in the case of FIG. 5A. In the association source information field, a directory ID for uniquely identifying a directory is recorded. In the association destination information field, a tenant ID for uniquely identifying a tenant is recorded. The "directory" refers, for example, to a department, a group, a team, or the like to which a user belongs. The directory ID is an example of first group information.

Figure 6:
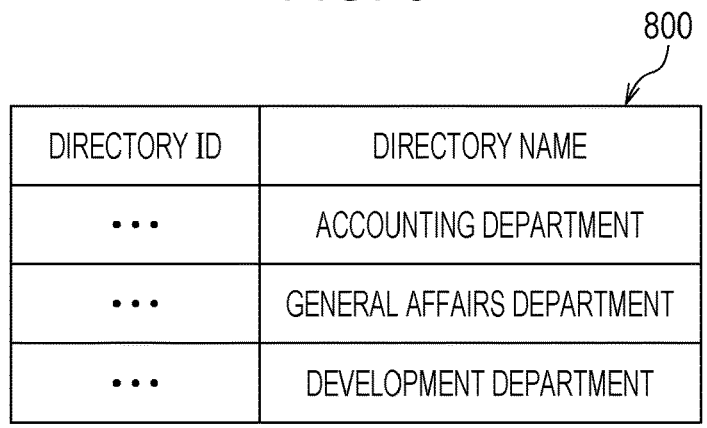
FIG. 6 illustrates an example of a directory information table stored in an external authentication server apparatus.
Figure 8:
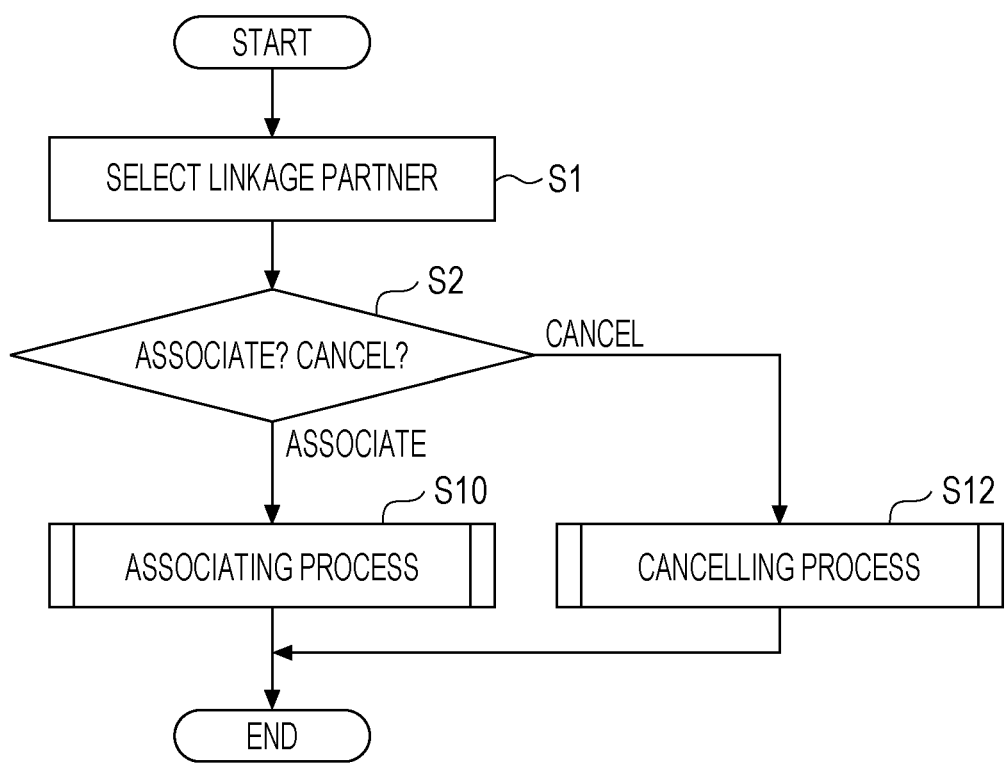
FIG. 8 is a flowchart illustrating an example of an operation of the service providing apparatus.

FIG. 6 illustrates an example of a directory information table 800 stored in the external authentication server apparatuses 8. The directory information table 800 includes items such as a directory ID and a directory name. In the directory ID field, a directory ID is recorded. In the directory name field, a directory name is recorded. The directory ID and the directory name sometimes differ depending on the external authentication server apparatus 8.

Next, the units 201 through 205 of the service providing apparatus 2 are described.

The receiving unit 201 is a service providing interface for administrator and user that receives a request from the administrator terminal apparatus 4A or the user terminal apparatus 4B and receives a request for login, authentication information, an authentication request, or the like and relays service content after permission.

The permission determining unit 202 permits a user to use the subject service within a range of authority set for a tenant ID in a case where predetermined information, for example, an e-mail address and a name is common to first user information acquired by the acquisition unit 205 and the second user information registered in the user information table 211. In a case where the predetermined information is not common, the permission determining unit 202 registers at least the predetermined information of the first user information in the user information table 211 and permits the user to use the present service within a range of authority set for the tenant ID.

The linkage setting unit 203 performs an associating process for associating association source information and association destination information and a cancelling process for cancelling the association on the basis of administrator's operation. The "associating process" is a process for associating information and information.

The linkage management unit 204 accesses the second linkage information table 213b and checks whether or not association information for linkage is registered. The linkage management unit 204 requests a linkage partner to provide the association source information. The linkage management unit 204 performs a user registration process and a user information updating process.

The linkage management unit 204 transmits information on a service-side login screen 400 (see FIG. 11A) to the user terminal apparatus 4B and presents the information to the user.

In a case where the user is authenticated by any of the external authentication server apparatuses 8, the acquisition unit 205 acquires first user information and first group information from authentication result information transmitted from the external authentication server apparatus 8. The authentication result information includes, for example, an authentication result indicative of success of authentication, an account ID, an e-mail address, a name (a family name and a first name), a directory ID, and the like of the user. The account ID, e-mail address, name, and directory ID are an example of the first user information. The e-mail address and name are an example of the predetermined information.

Operation of Exemplary Embodiment

Next, an example of an operation of the service providing system 1 is described.

(1) Linkage Management Process

Figure 9:
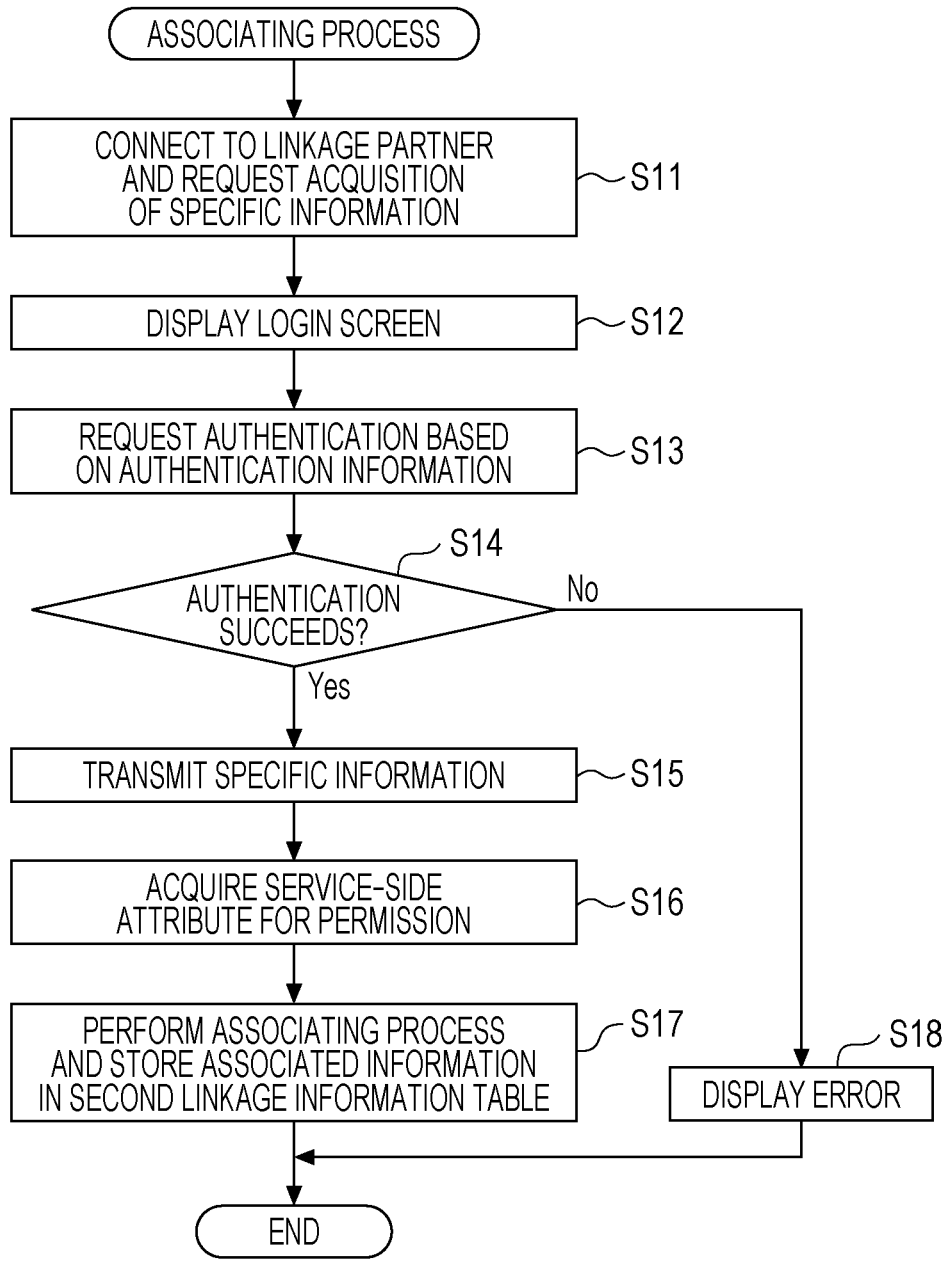
FIG. 9 is a flowchart illustrating an example of an associating process in the service providing apparatus.

A linkage management process is described in accordance with the flowchart of FIG. 9 with reference to FIG. 7. FIGS. 7A through 7D illustrate an example of a screen displayed on the display of the administrator terminal apparatus 4A. FIG. 9 illustrates an example of an operation of the administrator terminal apparatus 4A.

When a service-side administrator requests login by operating the input unit of the administrator terminal apparatus 4A, the controller of the administrator terminal apparatus 4A transmits the request for login to the service providing apparatus 2. Upon receipt of the request for login, the receiving unit 201 of the service providing apparatus 2 transmits information on a login screen to the administrator terminal apparatus 4A. The controller of the administrator terminal apparatus 4A displays the login screen on the display.

FIG. 7A illustrates an example of the login screen 400. On the login screen 400, a user ID entry field 401, a password entry field 402, a "login" button 403, a "provider A" button 404a, a "provider B" button 404b, and a "provider C" button 404c are provided. The "provider A" button 404a, the "provider B" button 404b, and the "provider C" button 404c are an example of connection means for connection with the external authentication server apparatuses 8A, 8B, and 8C, respectively. In this example, in a case where the service-side administrator wants to connect to the service providing apparatus 2, the service-side administrator does not operate the provider buttons 404.

The administrator enters a user ID (account ID) for administrator in the user ID entry field 401 and enters a password in the password entry field 402 by operating the input unit of the administrator terminal apparatus 4A and requests login by operating the "login" button 403. The controller transmits authentication information that is the user ID and the password to the service providing apparatus 2. The receiving unit 201 of the service providing apparatus 2 receives the authentication information.

The linkage setting unit 203 of the service providing apparatus 2 performs an authentication process for determining whether or not the authentication information is appropriate by determining whether or not the authentication information received by the receiving unit 201 matches an account ID and a password (each of which is not illustrated) recorded in the user information table 211. When authentication succeeds, the linkage setting unit 203 transmits information on a service-side management screen for administrator to the administrator terminal apparatus 4A. The controller of the administrator terminal apparatus 4A displays the service-side management screen on the display.

FIG. 7B illustrates an example of the service-side management screen 410. On the service-side management screen 410, a linkage partner setting region 411 and a linkage partner information setting region 412 are provided. The linkage partner setting region 411 has plural check boxes 411a for selection of a linkage partner provider, a "setup" button 411b for setting, as a linkage partner, a provider selected by checking any of the check boxes 411a, and a "delete" button 411c for deleting the provider selected by checking any of the check boxes 411a from the linkage partner.

The administrator selects a linkage partner by checking any of the check boxes 411a of the linkage partner setting region 411 of the service-side management screen 410 (S1). In this example, it is assumed that the administrator selects the provider A.

Next, the administrator activates a desired process, i.e., the associating process (S10) or the cancelling process (S20) by operating the "setup" button 411b or the "delete" button 411c (S2). In a case where the associating process (S10) is selected in Step S2, the controller of the administrator terminal apparatus 4A transmits association source information of the linkage partner as a target of the associating process to the service providing apparatus 2. In a case where the cancelling process (S20) is selected in Step S2, the controller of the administrator terminal apparatus 4A transmits association source information of the linkage partner as a target of the cancelling process to the service providing apparatus 2.

(2) Associating Process

The associating process in Step S10 is described in accordance with the flowchart of FIG. 9 with reference to FIGS. 7C and 7D. FIG. 9 is a flowchart illustrating an example of the associating process in the service providing apparatus 2.

The acquisition unit 205 accesses the linkage partner through a web browser and requests acquisition of association source information as specific information necessary for linkage (S11). The requested association source information includes, for example, a directory ID and a directory name registered in a database of the linkage partner. Since the administrator has not been authenticated on the linkage partner side, the external authentication server apparatus 8A of the linkage partner transmits information on a linkage partner login screen for authentication to the administrator terminal apparatus 4A. The controller of the administrator terminal apparatus 4A displays the linkage partner login screen for authentication on the display (S12).

FIG. 7C illustrates an example of the linkage partner login screen 420. On the linkage partner login screen 420, a user ID entry field 421, a password entry field 422, and a "login" button 423 are provided. The administrator enters a user ID for administrator in the user ID entry field 421 and enters a password in the password entry field 422 by operating the input unit of the administrator terminal apparatus 4A and requests login by operating the "login" button 423. The controller requests an authentication process by transmitting an authentication information that is the user ID and the password to the linkage partner (S13). The linkage partner performs an authentication process and transmits an authentication result to the administrator terminal apparatus 4A.

In a case where a result of authentication by the linkage partner is success (Yes in S14), the linkage partner responds by transmitting association source information as specific information to the administrator terminal apparatus 4A (S15). The controller of the administrator terminal apparatus 4A displays a permission screen on the display.

FIG. 7D illustrates an example of the permission screen 430. A message 431, a "yes" button 432, and a "no" button 433 are provided on the permission screen 430. The message 431 includes "permit notification of information below to * service? •directory ID . . . ". That is, by displaying the message 431 on the permission screen 430, the administrator is requested to permit registration of association information in the service providing apparatus 2**.

In a case where the notification is permitted by operating the "yes" button on the permission screen 430, the external authentication server apparatus 8A transfers the association source information to the service providing apparatus 2 (S15). In a case where authentication fails (No in S14), an error message is displayed on the display of the administrator terminal apparatus 4A (S18).

The linkage setting unit 203 acquires association destination information as a service-side attribute for permission from the tenant information table 212 (S16). The association destination information acquired by the linkage setting unit 203 includes a tenant ID and a tenant name registered in the tenant information table 212.

The linkage setting unit 203 performs an associating process for registration in the second linkage information table 213b on the basis of the acquired association source information and association destination information (S17). Specifically, in a case where the directory name and the tenant name match each other or correspond to each other, the linkage setting unit 203 performs an associating process for associating the directory ID and the tenant ID. The case where the directory name and the tenant name correspond to each other is a case where a business operation is shared. For example, an accounting department and a finance department share a business operation and therefore correspond to each other, and a personnel department and a general affairs department share a business operation and therefore correspond to each other. Association of a directory that is an example of the first group information and a tenant that is an example of the second group information is not limited to association based on a shared business operation. For example, association may be based on a shared managerial position of users or a shared age group of users instead of a shared business operation, plural pieces of first group information may be associated with a single piece of second group information, and a single piece of first group information may be associated with plural pieces of second group information.

(3) Cancelling Process

Figure 10:
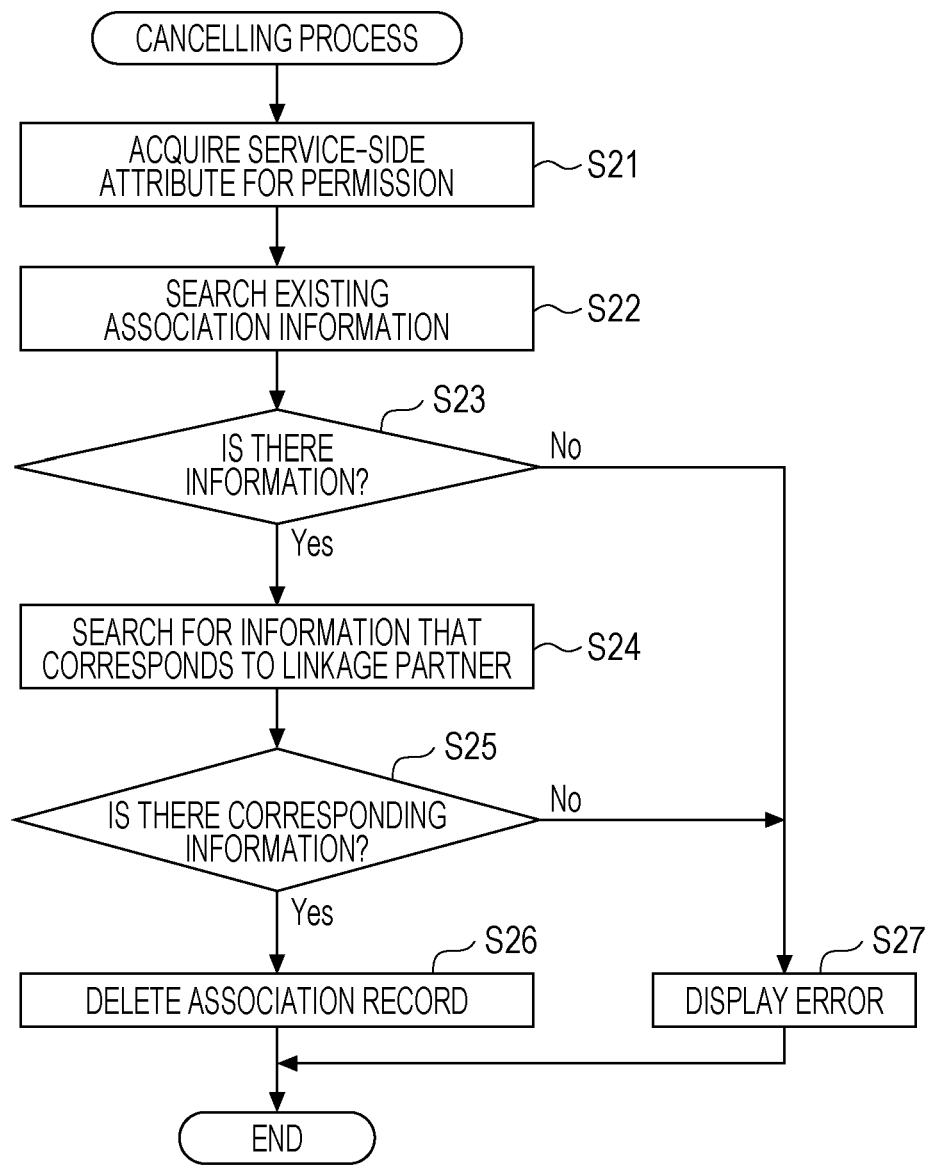
FIG. 10 is a flowchart illustrating an example of a cancelling process in the service providing apparatus.

The cancelling process is described in accordance with the flowchart of FIG. 10. FIG. 10 is a flowchart illustrating an example of the cancelling process in the service providing apparatus 2.

The controller of the administrator terminal apparatus 4A transmits user information to be deleted entered by administrator's operation of the input unit to the service providing apparatus 2. The user information includes, for example, an account ID, an e-mail address, and a name (a family name and a first name).

The linkage setting unit 203 acquires attribute information for permission, i.e., a tenant ID from the user information table 211 on the basis of the user information transmitted from the administrator terminal apparatus 4A (S21). Next, the linkage setting unit 203 determines whether or not the tenant ID acquired in Step S21 is registered by searching existing association destination information recorded in the second linkage information table 213b (S22).

The linkage setting unit 203 determines whether or not association source information is registered on the basis of candidates of association destination information thus found (S23). In a case where association source information is registered (Yes in S23), the linkage setting unit 203 searches for association source information that corresponds to the linkage partner ID (S24). In a case where there is a record of such association source information (Yes in S25), the record is deleted (S26).

In a case where the tenant ID acquired in Step S21 is not registered in the second linkage information table 213b in Step S23 (No in S23) or in a case where the record is not registered in Step S25 (No in S25), the linkage setting unit 203 displays an error message on the display of the administrator terminal apparatus 4A.

(4) Processing for Use of Service

Figure 11A:
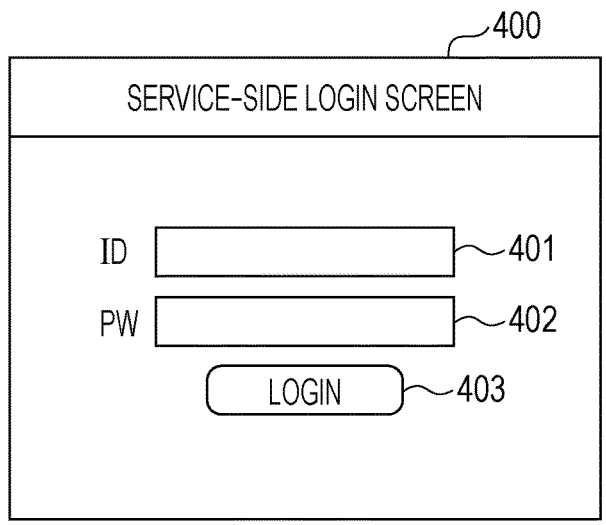
FIGS. 11A through 11C each illustrate an example of a screen displayed on a display of a user terminal apparatus.
Figure 11B:
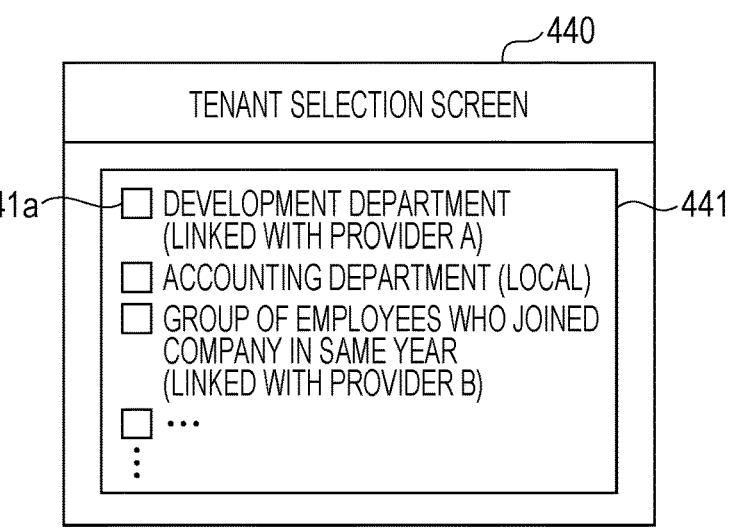
Figure 11C:
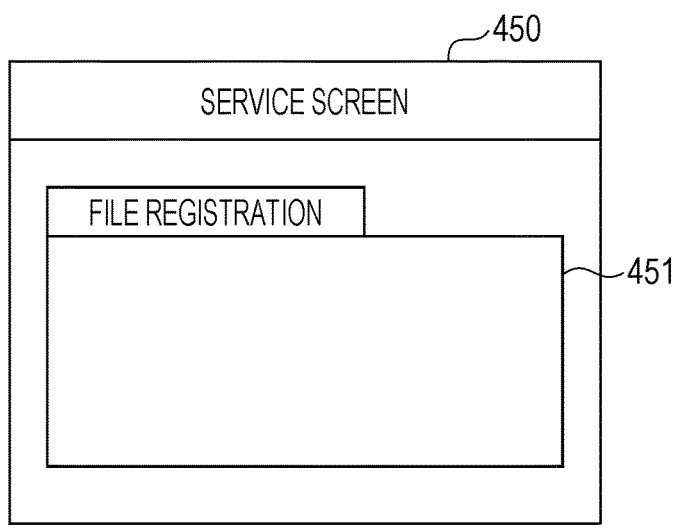
Figure 12:
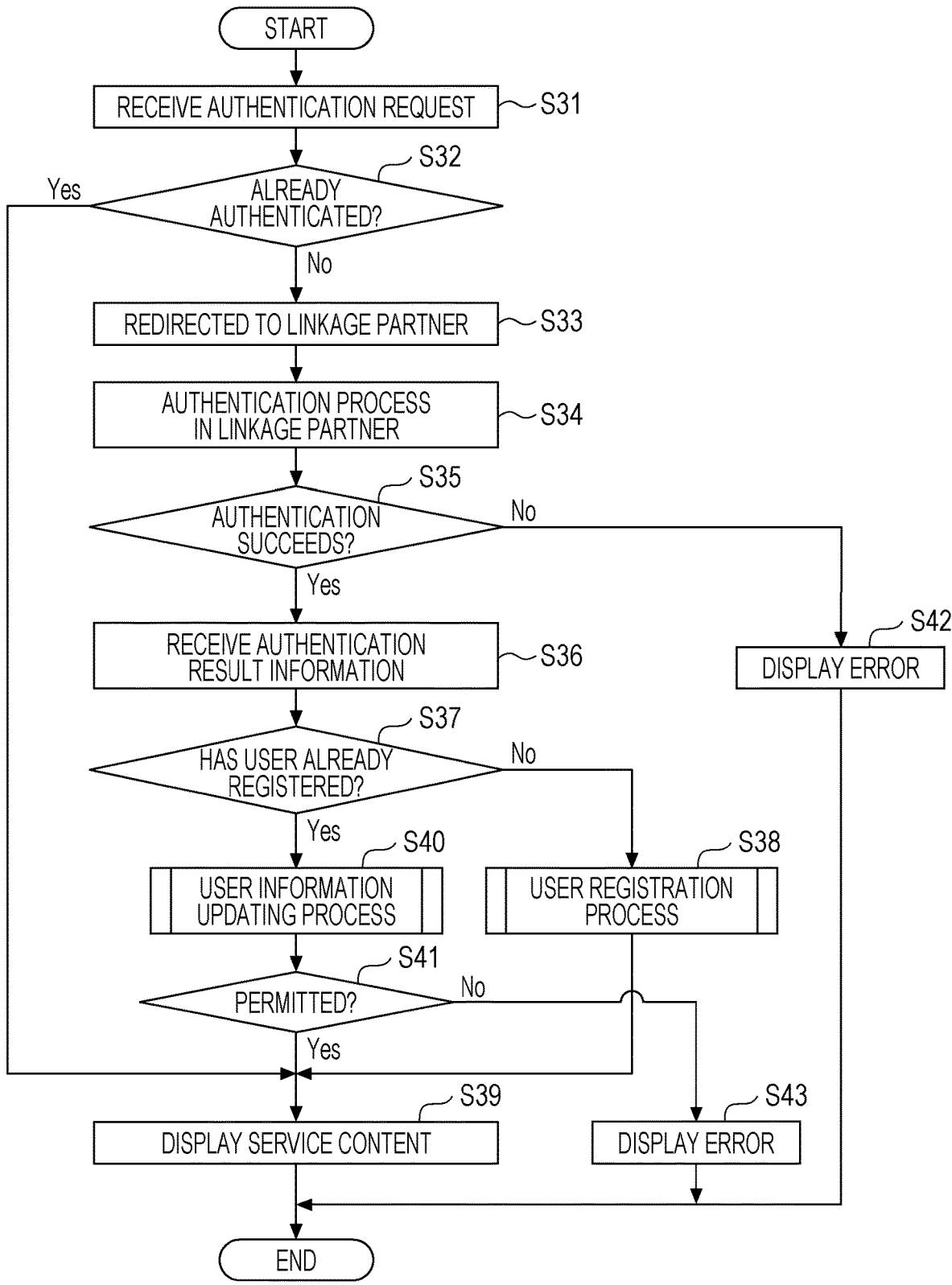
FIG. 12 is a flowchart illustrating an example of an operation of the service providing apparatus.
Figure 13:
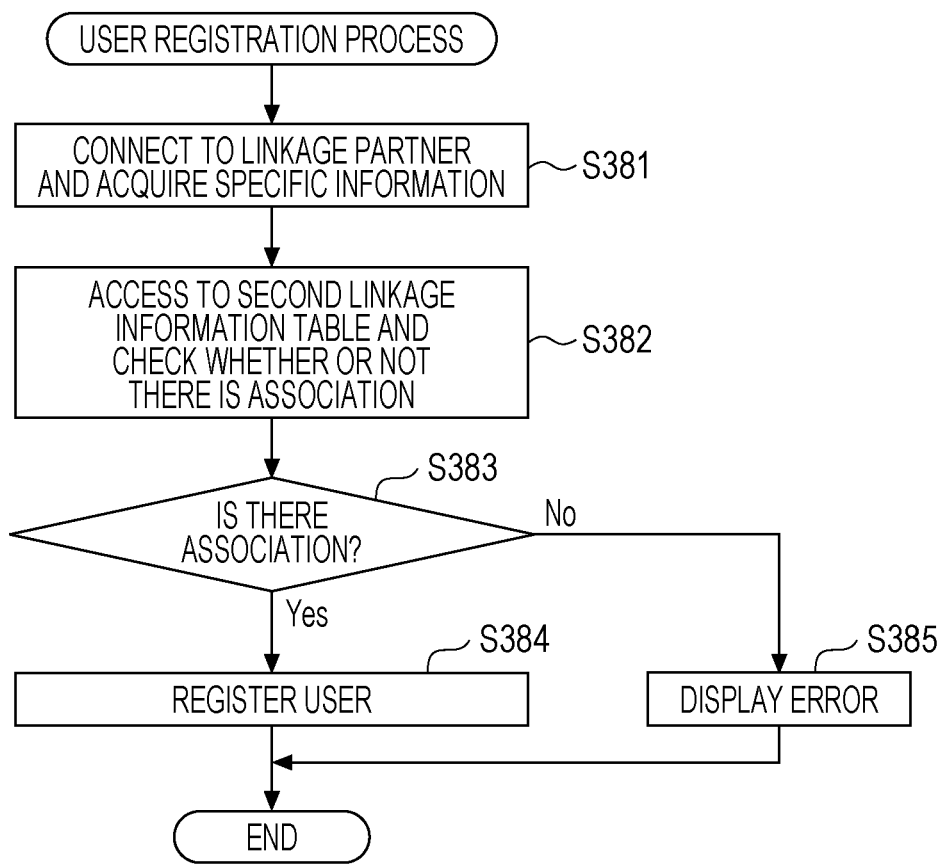
FIG. 13 is a flowchart illustrating a user registration process in the service providing apparatus.
Figure 14:
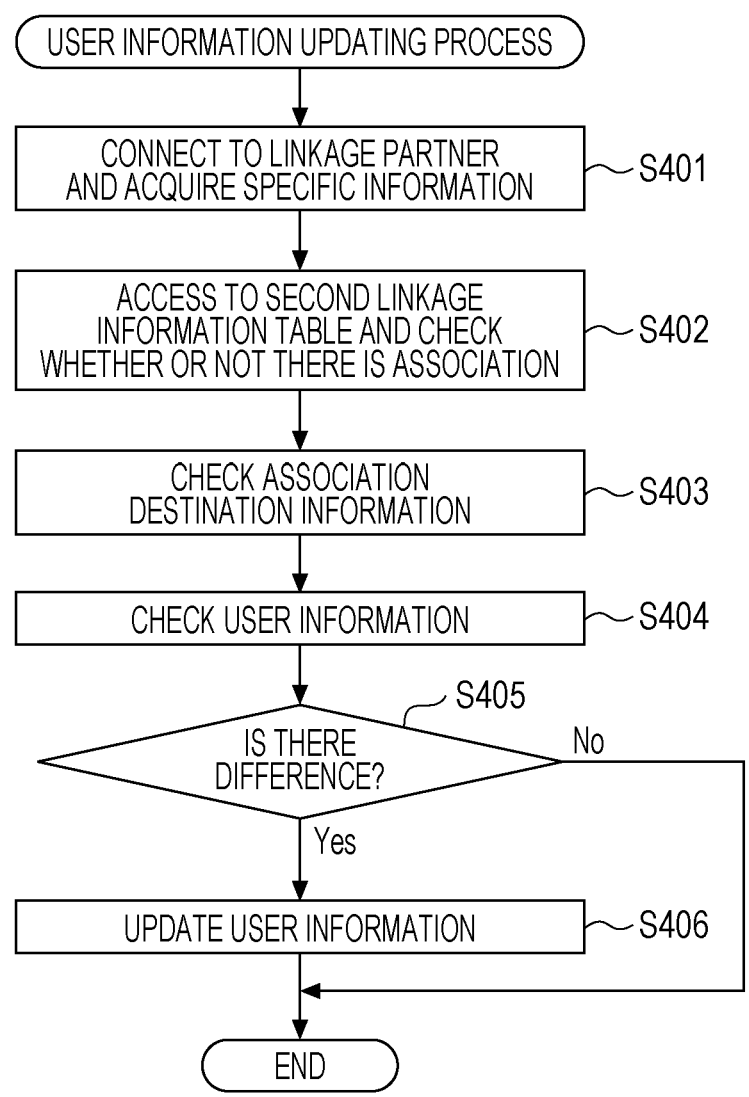
FIG. 14 is a flowchart illustrating an example of a user information updating process in the service providing apparatus.

Processing for use of a service is described in accordance with the flowcharts of FIGS. 12 through 14 with reference to FIG. 11.

The controller of the user terminal apparatus 4B transmits a request for login to the service providing apparatus 2 on the basis of user's operation of the input unit. Upon receipt of the request for login, the receiving unit 201 of the service providing apparatus 2 transmits information on a login screen to the user terminal apparatus 4B. The controller of the user terminal apparatus 4B displays the login screen on the display.

FIG. 11A illustrates an example of the login screen 400. The login screen 400 is identical to the one illustrated in FIG. 7A except for that the "provider" buttons 404a, 404b, and 404c are not provided, and therefore description of a screen configuration is omitted.

The user enters a user ID in the user ID entry field 401 and enters a password in the password entry field 402 by operating the input unit of the user terminal apparatus 4B and requests login by operating the "login" button 403. The controller transmits authentication information that is the user ID and the password to the service providing apparatus 2. The receiving unit 201 of the service providing apparatus 2 receives the authentication information.

The controller 20 of the service providing apparatus 2 performs an authentication process for determining whether or not the authentication information received by the receiving unit 201 matches an account ID and a password (each of which is not illustrated) recorded in the user information table 211. When authentication succeeds, the service providing apparatus 2 transmits information on a tenant selection screen to the user terminal apparatus 4B in a case where the user has plural tenant IDs. The controller of the user terminal apparatus 4B displays the tenant selection screen on the display. In a case where the user has a single tenant ID, the tenant selection screen need not be displayed on the display.

FIG. 11B illustrates an example of the tenant selection screen 440. A tenant selection region 441 is provided on the tenant selection screen 440. The tenant selection region 441 includes tenant names for the user and check boxes 441a. The user selects a tenant name to be used by checking any of the check boxes 441a by operating the input unit of the user terminal apparatus 4B.

The user terminal apparatus 4B transmits the selected tenant name to the service providing apparatus 2. The service providing apparatus 2 transmits information on a service screen within a range of authority set for the tenant name to the user terminal apparatus 4B. The controller of the user terminal apparatus 4B displays the service screen on the display.

FIG. 11C illustrates an example of the service screen 450. The user can use a service by selecting the service on the service screen 450. In the case illustrated in FIG. 11C, the service screen 450 has, as an external storage service, a file registration region 451 in which an uploaded file is registered.

On the service-side login screen 400 illustrated in FIG. 11A, the authentication information entered in the user ID entry field 401 and the password entry field 402 by the user need not be account information directly registered in the service providing apparatus 2 and may be account information for an ID provider registered in advance by the user. For example, in a case where the user selects the provider A, the user enters an account ID and a password for the provider A, and the user terminal apparatus 4B transmits an authentication request to the service providing apparatus 2. The receiving unit 201 of the service providing apparatus 2 receives the authentication request for the provider A (S31).

The permission determining unit 202 of the service providing apparatus 2 determines whether or not the user has been authenticated by the provider A (S32). Specifically, the permission determining unit 202 determines whether or not the user has been authenticated by the provider A by determining whether or not an authentication result indicative of success of authentication of the user has been received from the provider A.

In a case where the user has been authenticated, i.e., in a case where the user has logged in by using the account of the provider A and has been authenticated by the corresponding external authentication server apparatus 8A (Yes in S32), the service providing apparatus 2 has received a directory ID of the user together with the authentication result from the external authentication server apparatus 8A, and therefore the acquisition unit 205 of the service providing apparatus 2 acquires a tenant ID corresponding to the directory ID from the second linkage information table 213b. The permission determining unit 202 responds by transmitting, to the user terminal apparatus 4B, information on a service screen including service content within a range of authority set for the tenant ID of the user among service content provided by the apparatus 2. The controller of the user terminal apparatus 4B displays the service screen on the display.

FIG. 11C illustrates an example of the service screen 450. The user can use a service by selecting the service on the service screen 450. In the case illustrated in FIG. 11C, the service screen 450 has, as an external storage service, a file registration region 451 in which an uploaded file is registered. In a case where the user has been authenticated by any of the external authentication server apparatuses 8, the subject service can be used without need for user's entry operation for permission.

In a case where the user has not been authenticated in Step S32 (No in S32), the service providing apparatus 2 redirects the authentication information received by the receiving unit 201 to the external authentication server apparatus 8 for a linkage partner recorded in the first linkage information table 213a (S33). In this example, it is assumed that the provider A is registered as a linkage partner. The external authentication server apparatus 8A that has received the authentication information from the service providing apparatus 2 performs an authentication process concerning the account ID and the password included in the authentication information (S34).

In a case where authentication fails in the external authentication server apparatus 8A to which the authentication information has been redirected (No in S35), the user who has attempted login by operating the user terminal apparatus 4B is an unqualified user such as a user who does not have an account in the provider A, and therefore the external authentication server apparatus A returns error information to the service providing apparatus 2. In this case, the service providing apparatus 2 causes a message indicative of occurrence of an error to be displayed on the user terminal apparatus 4B on the basis of the received error information (S42). In a case where plural linkage partners are registered in the first linkage information table 213a, the service providing apparatus 2 redirects the authentication information to each of the external authentication server apparatuses 8 that correspond to registered linkage partner IDs so that each of the external authentication server apparatuses 8 performs an authentication process.

When authentication succeeds in the external authentication server apparatus 8A to which the authentication information has been redirected (Yes in S35), authentication result information including an authentication result is transferred from the external authentication server apparatus 8A to the service providing apparatus 2 (S36). The authentication result information includes an authentication result indicative of success or failure of authentication and user information such as an account ID, an e-mail address, a name (a family name and a first name), and a directory ID of the user. The account ID, e-mail address, name, and directory ID are an example of the first user information. The authentication result and other information of the authentication result information may be transmitted separately.

The acquisition unit 205 extracts the user information and the directory ID as association source information from the authentication result information. The permission determining unit 202 accesses the user information table 211 on the basis of the extracted information and determines whether or not the user has been registered already (S37). Specifically, the permission determining unit 202 determines whether or not the user has been registered already by determining whether or not predetermined information is common to the user information included in the authentication result information and the user information registered in the user information table 211.

In a case where the user has not been registered (No in S37), a user registration process is performed (S38), and service content is displayed in response (S39). Since the user registration process (S38) also plays the role of permission, a permission determining process (S41) is unnecessary.

In a case where it is determined in Step S37 that the user has been already registered (Yes in S37), a user information updating process is performed (S40), and then the permission determining process is performed (S41).

In the permission determining process (S41), the permission determining unit 202 permits the user in a case where association destination information (tenant ID) corresponding to the extracted association source information (directory ID) is registered in the second linkage information table 213b (Yes in S41), and the permission determining unit 202 does not permit the user in a case where the association destination information (tenant ID) corresponding to the extracted association source information (directory ID) is not registered in the second linkage information table 213b (No in S41).

In a case where the user is permitted (Yes in S41), service content is displayed in response (S39). In a case where authentication succeeds in Step S35 (No in S35) or in a case where the user is not permitted in Step S41 (No in S41), an error message is displayed on the user terminal apparatus 4B (S42 and S43).

Since the user information updating process (S40) includes deletion of existing authority (e.g., deletion of a tenant ID), the permission determining process (S41) is needed after the update.

(5) Initial User Registration Process

The initial user registration process in Step S38 is described in accordance with the flowchart of FIG. 13.

The service providing apparatus 2 connects to the external authentication server apparatus 8 for the linkage partner and acquires association source information as specific information (S381). In this case, since the service providing apparatus 2 accesses the linkage partner by using an account ID registered in advance in the linkage partner, it is unnecessary for the user to manually enter authentication information.

The linkage management unit 204 accesses the second linkage information table 213b (S382) and checks whether or not association information is registered (S383). That is, the linkage management unit 204 determines whether or not a tenant ID corresponding to the directory ID of the linkage source is registered in the second linkage information table 213b.

In a case where the tenant ID is not registered (No in S383), it is determined that the user does not have use authority, and information on an error screen is transmitted to the user terminal apparatus 4B in response (S385). The controller of the user terminal apparatus 4B displays the error screen on the display.

In a case where the tenant ID is registered (Yes in S383), user information is registered in the user information table 211 (S384). In this case, at least an e-mail address and a name are registered. The above process corresponds to permission (authorization).

(6) User Information Updating Process

The user information updating process in Step S40 is described in accordance with the flowchart of FIG. 14.

The linkage management unit 204 of the service providing apparatus 2 connects to the external authentication server apparatus 8 for the linkage partner and acquires association source information as specific information from the linkage partner (S401). In this case, since the linkage management unit 204 accesses the linkage partner by using an account ID registered in advance in the linkage partner, it is unnecessary for the user to manually enter authentication information.

The linkage management unit 204 accesses the second linkage information table 213b and checks whether or not association information is registered (S402).

Whether or not there is a tenant ID (hereinafter referred to as A) as association destination information is checked on the basis of a record thus found (S403). In a case where there is no record, it is determined that there is no association destination information.

The linkage management unit 204 accesses the user information table 211 and checks a tenant ID (hereinafter referred to as B) as association destination information of the user (S404).

In a case where there is a difference between A and B (Yes in S405), the user information table 211 is updated (S406). That is, B is adjusted to A. For example, in a case where B is a tenant ID (T1) of the development department A and a tenant ID (T2) of an accounting department and A is only the tenant ID (T1) of the development department A, the tenant ID of the accounting department is deleted from the user information table 211, and therefore the user becomes unable to access the accounting department.

In a case where there is no difference between A and B (No in S405), the user information updating process is finished.

Modification 1

Although the service providing apparatus 2 has the user information table 211, the tenant information table 212, and the linkage information table 213 in the above exemplary embodiment, a database server apparatus connected to the internal network 5 may have these tables 211 through 213.

Furthermore, the database server apparatus connected to the internal network 5 may have the user information table 211 and the tenant information table 212 that are an example of a second memory or the linkage information table 213 that is an example of a first memory.

The exemplary embodiment of the present invention has been described above, the exemplary embodiment of the present invention is not limited to the above exemplary embodiment, and the exemplary embodiment may be modified in various ways without departing from the spirit of the present invention.

Part of or all of each unit of the controller 20 may constituted by a hardware circuit such as a field programmable gate array (FPGA) or an application specific integrated circuit (ASIC).

Furthermore, one or more of the constituent elements of the exemplary embodiment may be omitted or changed without changing the spirit of the present invention. Furthermore, addition, deletion, change, replacement, or the like of a step may be made in the flows of the exemplary embodiment. A program used in the exemplary embodiment may be provided while being recorded in a computer-readable recording medium such as a CD-ROM. Furthermore, a program used in the exemplary embodiment may be stored in an external server such as a cloud server and used over a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to function as:
an acquisition unit that acquires first group information concerning a user from authentication result information including an authentication result transmitted from an external apparatus in a case where the user is authenticated by the external apparatus; and
a permission unit that permits the user to use a service provided by the information processing apparatus within a range of authority set for second group information concerning the user in a case where the acquired first group information is associated with the second group information;
a first memory in which the first group information and the second group information are stored in association with each other; and
a second memory in which the second group information and second user information for specifying the user are stored in association with each other,
the acquisition unit acquires first user information in addition to the first group information from the authentication result information, wherein:
in a case where predetermined information is common to the first user information acquired by the acquisition unit and the second user information stored in the second memory, the permission unit permits the user to use the service within the range set for the second group information, in a case where the predetermined information is not common, the permission unit causes at least the predetermined information of the first user information to be stored in the second memory in association with the second group information and permits the user to use the service within the range set for the second group information, and the predetermined information includes at least one of a name of the user and address information of a terminal apparatus used by the user.

2. The information processing apparatus according to claim 1, wherein the processor is further programmed to function as updating unit that updates the second group information stored in the second memory to the second group information stored in the first memory in a case where the predetermined information is common to the first user information and the second user information stored in the second memory and where there is a difference between the second group information stored in the first memory and the second group information included in the second user information stored in the second memory.

3. The information processing apparatus according to claim 1, wherein the first user information acquired by the acquisition unit does not include all pieces of authentication information necessary for authentication performed by the external apparatus.

4. The information processing apparatus according to claim 1, wherein the predetermined information includes the name of the user.

5. The information processing apparatus according to claim 1, wherein the predetermined information includes the address information of the terminal apparatus used by the user.

6. The information processing apparatus according to claim 1, wherein the processor is further programmed to function as presenting unit that presents, to the user, a screen including an entry field for entry of authentication information for authentication of the user by the information processing apparatus and a connection initiator for connection with the external apparatus.

7. The information processing apparatus according to claim 6, wherein the presenting unit presents, to the user, a screen for entry of authentication information for authentication of the user by the external apparatus after connection to the external apparatus and transmits the authentication information entered on the screen to the external apparatus so that the external apparatus performs an authentication process.

8. The information processing apparatus according to claim 1, wherein the permission unit permits the user to use the service without entry of information for permission in a case where the user is authenticated by the external apparatus.

9. A non-transitory computer readable medium storing a program causing a computer to execute a process comprising:

acquiring first group information concerning a user from authentication result information including an authentication result transmitted from an external apparatus in a case where the user is authenticated by the external apparatus;

permitting the user to use a service provided by an information processing apparatus within a range of authority set for second group information concerning the user in a case where the acquired first group information is associated with the second group information;

storing, in a first memory, the first group information and the second group information in association with each other;

storing, in a second memory, the second group information and second user information for specifying the user in association with each other;

acquiring first user information in addition to the first group information from the authentication result information;

in a case where predetermined information is common to the acquired first user information and the second user information stored in the second memory, permitting the user to use the service within the range set for the second group information, in a case where the predetermined information is not common, causing at least the predetermined information of the first user information to be stored in the second memory in association with the second group information and permitting the user to use the service within the range set for the second group information, wherein the predetermined information includes at least one of a name of the user and address information of a terminal apparatus used by the user.

* * * * *